United States Patent [19]

Huber et al.

[11] Patent Number: 4,969,367

[45] Date of Patent: Nov. 13, 1990

[54] AIRCRAFT PROPELLER SERVICING UNIT

[75] Inventors: Kenneth R. Huber, St. Clair; Edward C. Jonatzke, Mt. Clement, both of Mich.

[73] Assignee: The United States of America as represented by the Secretary of the Air Force, Washington, D.C.

[21] Appl. No.: 360,947

[22] Filed: Apr. 28, 1989

[51] Int. Cl.⁵ ............................................. G01N 19/00
[52] U.S. Cl. ................................................... 73/865.9
[58] Field of Search ..................... 73/865.9; 244/65, 66

[56] References Cited

U.S. PATENT DOCUMENTS 2,201,369  5/1940  Hem ....................................... 73/455
2,343,383  3/1944  Martin et al. .......................... 73/455

FOREIGN PATENT DOCUMENTS 0520525  7/1976  U.S.S.R. ............................... 73/865.9

Primary Examiner—Charfles T. Jordan
Assistant Examiner—Michael Carone
Attorney, Agent, or Firm—Gerald B. Hollins; Donald J. Singer

[57] ABSTRACT

An energizing and functional exercising apparatus for use with a variable pitch aircraft propeller in a maintenance shop environment is disclosed. Use of the apparatus enables functioning and performance check-out of an overall propeller assembly while the assembly is mounted on a cradle received engine in a hanger or maintenance shop and without requiring use of the aircraft or exposure of maintenance personnel to inclement weather. The disclosed apparatus provides electrical energization and control of the hydraulic system received within the propeller assembly and additionally provides check-out of sensing functions contained within the propeller assembly. Latched energization of the blade driving apparatus until a predetermined blade position is obtained and remote control of the blade movement operation are incorporated features of the disclosed apparatus.

19 Claims, 4 Drawing Sheets

AIRCRAFT PROPELLER SERVICING UNIT

RIGHTS OF THE GOVERNMENT

The invention described herein may be manufactured and used by or for the Government of the United States for all governmental purposes without the payment of any royalty.

BACKGROUND OF THE INVENTION

This invention relates to apparatus used in the maintenance of large aircraft propeller assemblies.

The propeller assemblies used in present-day military transport and civilian aircraft are vested with a significant degree of engine and flight condition accommodating ability. It is common practice, for example, to provide such propellers with the ability to vary the blade pitch position in response to engine rotational velocity, aircraft flight needs, and; of course; to provide for complete reversal of the blade pitch and the propeller generated thrust force during landing or other ground maneuvering operations. In large multiple-engine aircraft, the control of propeller blade pitch angle also involves considerations of pitch and rotational synchronization between multiple propellers. The determination of blade operating pitches in such larger aircraft of the type used by the U.S. military is frequently accomplished through the use of pressurized hydraulic systems and for reasons involving reliability and engine-propeller design convenience, the hydraulic system of such propellers is frequently arranged to be self-contained within the propeller assembly as opposed to being a part of either the aircraft or the engine hydraulic systems.

In the case of military turbine engine driven propellers, for example, the propeller hydraulic system includes a plurality of pressure generating and scavenge pumps which are connected in a redundant or failure-preventing backup arrangement and are energized by a combination of engine torque and electrical motor driven—frequency an electrical motor of the three-phase 400 cycle alternating current variety. In this hydraulic system arrangement, the electric motor driven, pressure generating and scavenge pumps are identified as auxiliary pumps to the engine driven pumps. These electrically driven auxiliary pumps, in addition enable the changing of propeller blade pitch angles even though the propeller is rotationally at rest, that is, during an in-flight feathered propeller condition or in conjunction with an engine start-up in-flight or for ground static blade angle changing. As described below, these auxiliary pumps are also useful during the latter phases of a propeller maintenance routine.

The complexitY of the final adjustment and check-out operations to be performed on such propeller assemblies can be appreciated from a cursory review of the technical order document which describes the performance of such steps for a military aircraft. The technical order identified as TO-1C-130B-2-11, for example applies to the herein referred-to propeller assembly of the C-130 aircraft. This document has been periodically updated, most recently in August of 1988. The contents of the TO-1C-130B-2-11 technical order are hereby incorporated by reference in the present document. Section two of this technical order is of special interest with respect to the present invention, since it recites in some detail a number of the check-out and adjustment operations which are supported by the apparatus of the present invention.

It is parenthetically notable in this section two that the blade pitch angle in a propeller of the described type should not be changed when the propeller has been exposed to temperatures of 32° F. or lower without first warming the propeller hub oil through the use of warm air or engine running. This precaution is required in order that damage to the propeller blade shank seals and consequential hydraulic system oil leakage may be avoided. In practice, however, this warmup procedure requires about ½ hour of maintenance personnel time to accomplish. Both this time delay and the difficulty of working on the propeller assembly in unpleasant outdoor weather conditions are largely avoided by use of the present invention and result in an engine and propeller assembly that are operationally verified while yet indoors.

Periodic maintenance, including complete teardown and component inspection, are therefore normal activities in the life cycle of most aircraft components, including variable pitch propeller assemblies. In the latter phases of this maintenance activity, it is usually desirable to reintegrate the components of the propeller assembly and then mount this assembly on the propeller driving shaft of an engine gearbox while the engine is held in a portable test stand. In this condition it is possible to perform a number of visual and functional checks of the propeller assembly in a more convenient and non-aircraft mounted condition. Such off-aircraft inspection and testing of a worked-upon propeller assembly is found to be of great convenience in an operational aircraft situation for a number of additional very practical reasons. Such inspection and testing, for example, provides a significantly improved probability of the propeller assembly being in defect-free usable condition before investment of airframe time into the maintenance procedure.

The ability to perform a major number of check-out steps on a reassembled propeller assembly within the aircraft hanger or propeller shop as opposed to performing these steps after the reassembled propeller is mounted on the aircraft can also be understood to minimize the hours that maintenance personnel are required to work around the aircraft and out-of-doors in hostile weather conditions. Avoiding the physical height, awkward positioning and large physical separations between cooperating maintenance team members needed when these check-out steps are performed on the aircraft is itself a significant improvement in the propeller maintenance sequence. When final propeller check-out is performed on the aircraft, for example, it is frequently necessary to position one maintenance team member in the cockpit while another team member is located close by the propeller assembly to perform leak checking, adjustments, and propeller function verifying activities.

In order to accomplish these final check-out and basic functioning activities while the propeller assembly is indoors and mounted on the output shaft of an engine gearbox assembly, it is necessary to achieve a propeller assembly cooperative apparatus which provides both propeller assembly component energization and propeller control signals together with indication of proper functioning of the sensor apparatus that is included within the propeller assembly. Preferably, these energy source, control signal; and sensor indication functions should originate in an apparatus that is convenient and suited for use in the aircraft maintenance environment—apparatus that provides both maximum maintenance person convenience and realistic interfacing with the signal and energy ports of the propeller assembly. The present invention involves apparatus fulfilling these objectives.

Apparatus for testing aircraft propellers is known in the patent art and is exemplified, for example, by the patents of H.O. Hem, U.S. Pat. No. 2,201,369, and E. Martin et al, U.S. Pat. No. 2,343,383, wherein unmounted aircraft propellers are tested and repaired with respect to their static and dynamic balance.

SUMMARY OF THE INVENTION

The present invention provides the energy, control functions, and internal sensor readout functions that enable off-aircraft exercising of a variable pitch aircraft propeller assembly, a propeller assembly of the type used on large military and civilian transport aircraft. The described embodiment of the invention is usable with propellers of the Hamilton-Standard Manufacturing Company type.

It is an object of the present invention, therefore, to provide a maintenance console usable in functionally exercising and checking the performance of a variable blade pitch aircraft propeller.

It is another object of the invention to provide the electrical energy of two different types, needed for exercising of a propeller assembly.

It is another object of the invention to provide the 28-volt DC energy and the 120 volt, 400 cycle, three-phase alternating current energy used in a propeller assembly.

It is another object of the invention to provide a propeller assembly energizing and exercising apparatus which is maximally similar to the propeller control system of the hosting aircraft.

It is another object of the invention to provide a propeller assembly energizing and exercising arrangement which is suited for use with the propeller system of the C-130 transport used by the U.S. military.

It is another object of the invention to provide a maintenance environment propeller assembly energizing and exercising arrangement which provides an override of the normal control arrangement to achieve a predetermined feathered blade propeller condition.

It is another object of the invention to provide the manually initiated-manually maintained, and the manually initiated-electrically latched functions needed for interfacing with the electrically-driven auxiliary pumps and the control apparatus of the Hamilton-Standard hydraulic propeller assembly.

It is another object of the invention to provide a maintenance-oriented propeller assembly testing and exercising arrangement which may be interfaced with a propeller assembly at a plurality of differently located interfacing ports, one port at the propeller assembly and one port at the engine to aircraft junction, for example.

It is another object of the invention to provide a propeller assembly testing and exercising arrangement wherein a plurality of flexible tether cords are used to connect the testing apparatus to sources of electrical energy and to the normal propeller assembly interfacing ports.

Additional objects and features of the invention will be understood from the following description and the accompanying drawings.

These and other objects of the invention are achieved by servicing apparatus for functionally exercising the control system of an electro-hydraulic variable pitch aircraft propeller assembly comprising the combination of: a maintenance person operable portable test console which includes a electrical source for energizing a propeller assembly disposed blade positioning hydraulic pump, an electrically controlled contactor for connecting the hydraulic pump with the electrical source, first manually maintainable means for energizing said contactor until said propeller assembly blades attain an operator selected pitch position within the range of reverse thrust to maximum forward propulsion thrust, a second manually-initiated and electrically maintained latching means for energizing said contactor until said propeller assembly blades attain a minimum aircraft slipstream engaging feathered position.

DETAILED DESCRIPTION

Figure 1:
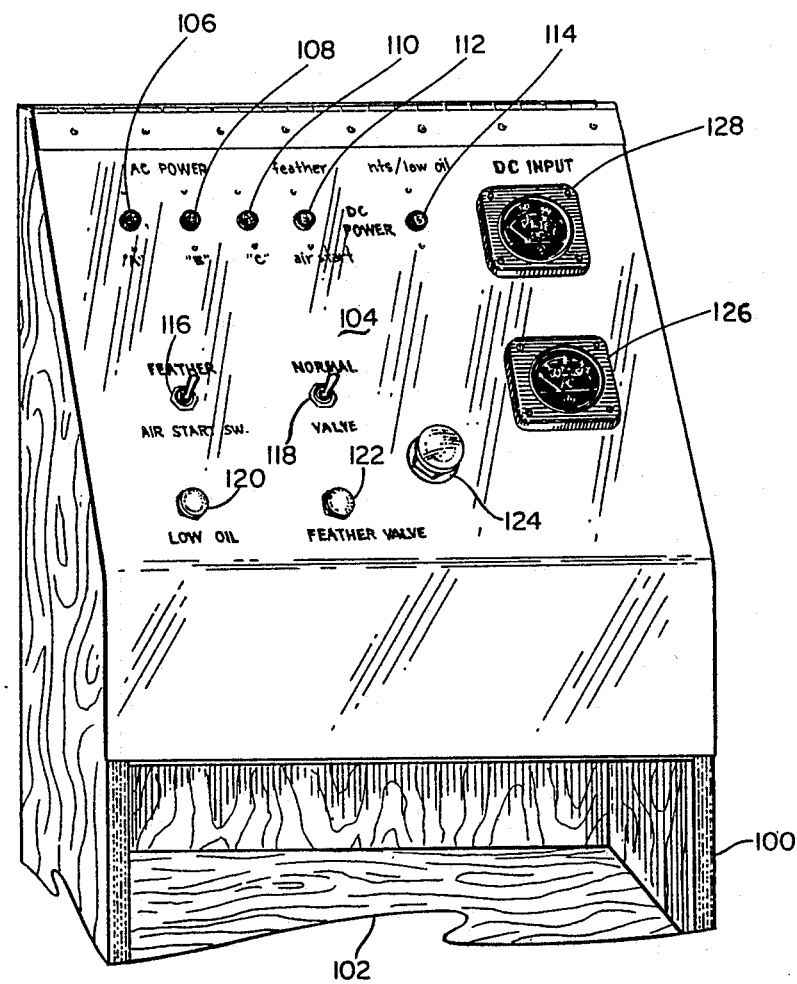
FIG. 1 is a prospective view of a propeller assembly servicing apparatus made in accordance with the invention.

FIG. 1 in the drawings shows an overall perspective view of a test console 100 which houses the components of a propeller assembly testing and functional exercising apparatus—an embodiment of such apparatus that is particularly suited for use with the Hamilton-Standard hydraulically actuated variable pitch propeller assembly of the C-130 military transport aircraft. The cabinet portion of the test console 100 is shown in abbreviated or shortened form in FIG. 1, as is indicated by the break line 102. The console 100 is preferably arranged to stand about elbow high to an average maintenance person and is provided with floor rollers and flexible electrical cables, such as will enable its convenient use around an aircraft maintenance hanger. The console may be provided with shelves, coiled cable supporting brackets, a plurality of tilting and towing handles and other physical conveniences as may occur to persons skilled in the test equipment design art.

Mounted on the sloping panel portion 104 of the FIG. 1 apparatus are a plurality of electrical devices which are used in energizing and controlling the exercising of the variable pitch propeller assembly. These devices include the current limiting circuit breakers 106, 108, 110, 112, and 114; the maintenance technician or operator selectable switches 116 and 118; a pair of condition indicating visual signals or lamps 120 and 122; the latching button 124; and a pair of voltage indicating meters 126 and 128. Each of these electrical devices is more fully described below in connection with the circuit diagrams of FIGS. 2 and 3.

Figure 2:
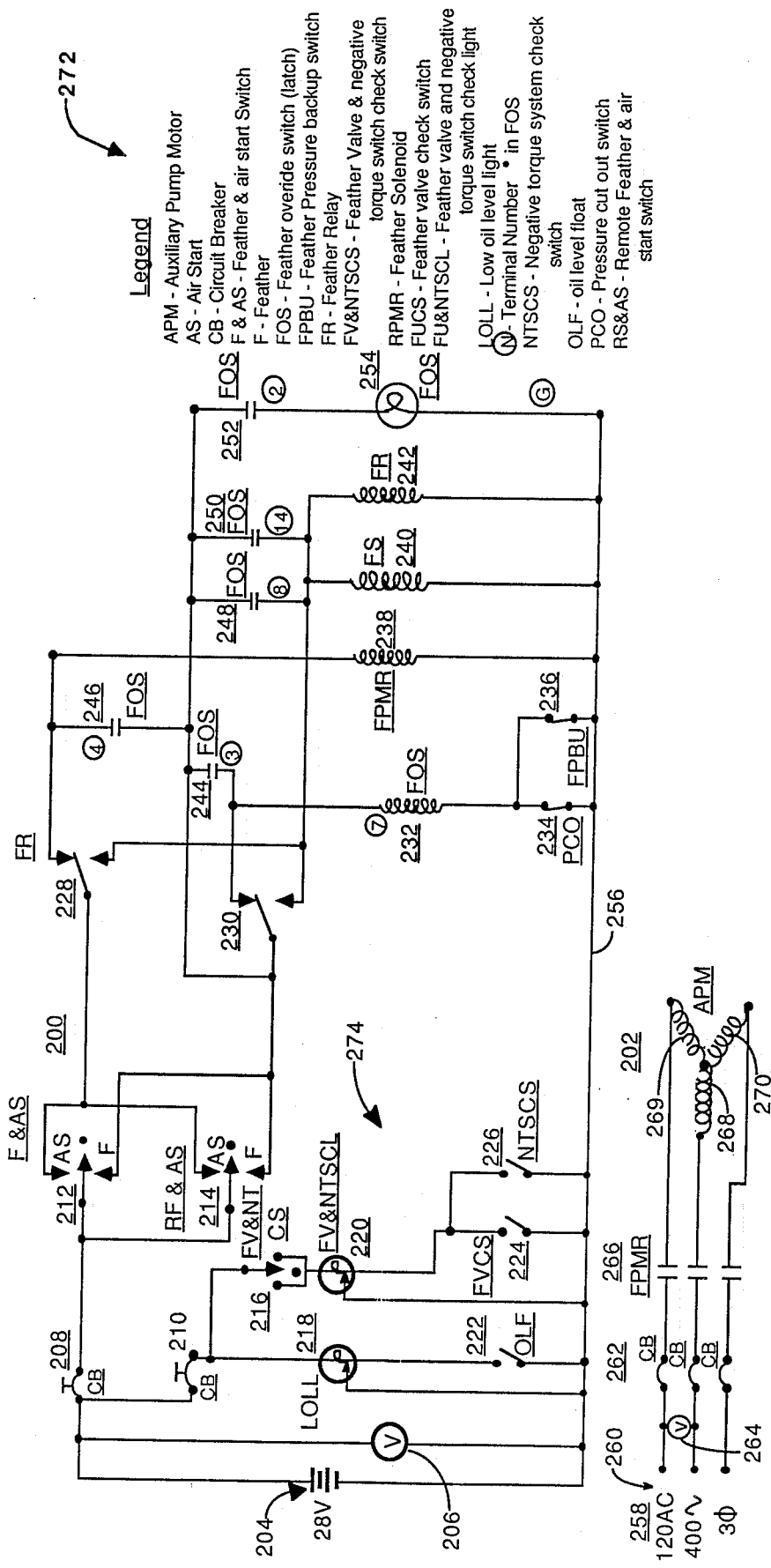
FIG. 2 is an electrical schematic diagram of the FIG. 1 apparatus together with its connection to the affected components of the propeller assembly.

FIG. 2 in the drawings shows an electrical schematic diagram of the FIG. 1 apparatus together with a legend 272 for identifying the alphabetic symbols used in the FIG. 2 schematic portion diagram. The FIG. 2 schematic diagram also includes two major circuit portions, the direct current circuit portion indicated at 200 and the alternating current circuit portion indicated at 202. In the direct current portion 200 a source of direct current energy, a source which is represented for simplicity as the battery 204 is used to energize a plurality of indicators, switches, and magnetic control devices. The devices include the coil of the feather pump motor relay 238, a coil which controls the closing of the feather pump motor relay contacts 266 in the alternating current circuit 202.

Prior to embarking into a further description of the FIG. 2 circuit, a brief additional description of the propeller assembly being energized by the FIG. 2 apparatus is believed helpful. A fully detailed description of this propeller assembly is to be found in the above referred-to technical order for the C-130 Hamilton-Standard propeller assembly. Generally, however, a propeller of this type is capable of blade pitch positions which lie between the extremes of a position of reverse thrust, and a position of maximum forward thrust. In the maximum reverse thrust position, the propeller is in the blade position which generates air-derived braking forces on the aircraft; such a position is referred to as a minus seven degree blade position. The maximum forward thrust position relates to some positive blade angle which maintains the engine speed at a value designated as 100% RPM.

Continuing the consideration of blade position sequence, starting from a position of maximum reverse thrust and proceeding toward positions of positive thrust, at an angle of positive five degrees the blades are in a ground idle condition wherein minimum thrust occurs, at an angle of seventeen and one-half degrees, the blades are in the flight idle position and at angles between twenty-five and fifty-five degrees the blades are in conditions of maximum forward torque; and at an angle of ninety-two and one-half degrees the blades are in the "feathered" condition wherein minimal engagement of the aircraft slipstream and zero thrust generation occurs.

The selection of a blade pitch angle in the twenty-five to fifty-five degree range is determined in the C-130 propeller by a combination of the engine governor and the aircraft throttle setting in order to maintain constant speed at the output of the driving engine. These latter governor controlled blade positions are beyond the control of the FIG. 1-3 apparatus and are; in fact; determined by a mechanical signal originating in the so-called engine coordinator portion of the complete engine assembly.

In the C-130 transport, the engine and propeller assembly also includes a synchronization arrangement which is used to maintain relatively identical positions of the four propellers of the aircraft for a minimizing of vibration effects. The synchronizing circuit is not, however, involved with the maintenance apparatus of the present invention.

Movement of the propeller blades into these various thrust generating positions is accomplished by the action of pressurized hydraulic fluid on a piston sleeve member which in turn actuates a pair of rotating and stationary cam members that are gear coupled to the propeller blade shafts. As indicated above during flight operation of the propeller assembly, hydraulic pressure for moving the piston assembly is generated by the engine driven high pressure hydraulic pump and spent hydraulic fluid is collected by an engine driven scavenging pump. For use during intervals of feathered propeller operation or in-flight engine start-up, the main hydraulic pump and scavenging pump are supplemented by electrically-driven auxiliary pressure and scavenging pumps. The electrical motor driving these auxiliary pumps is made to operate from three-phase 400 cycle 120 volt (phase to neutral) electrical energy. For operation of the propeller assembly under control of the FIG. 1-3 maintenance apparatus, this auxiliary pump motor is energized by the FIG. 2 circuitry.

The C-130 propeller assembly also includes a negative torque sensing arrangement which is used to indicate flight conditions wherein the propeller to engine torque is indicating negative due to the propeller rotating at a higher speed than the engine and thereby actually driving the engine. In normal use of the propeller assembly in-flight, an indication of negative engine torque calls for an increased blade angle for the negative torque engine.

Figure 3A:
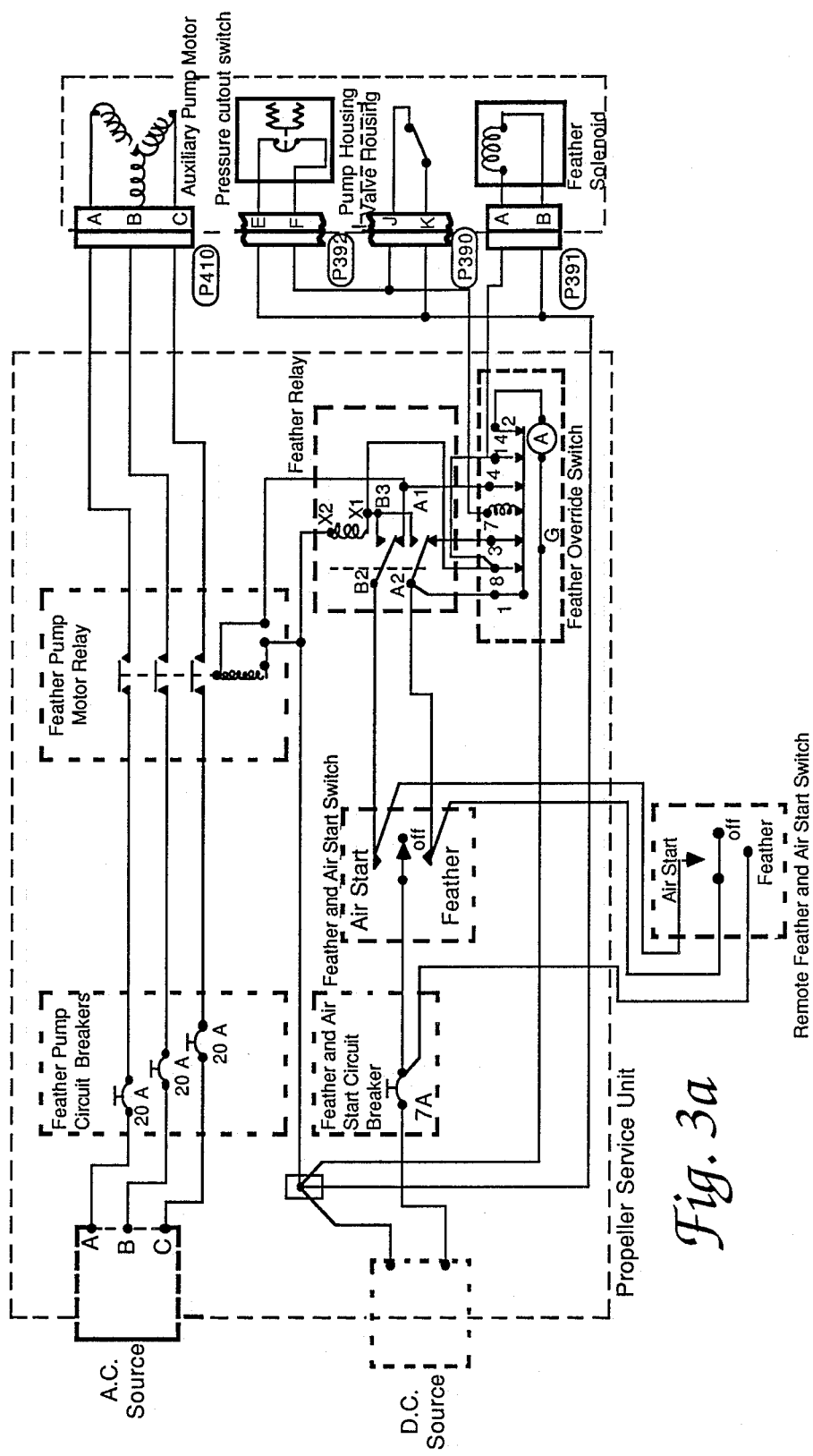
FIG. 3, including the portions of FIG. 3A and FIG. 3B, shows a pictorial wiring embodiment of the FIG. 2 apparatus and its interface with propeller assembly components.
Figure 3B:
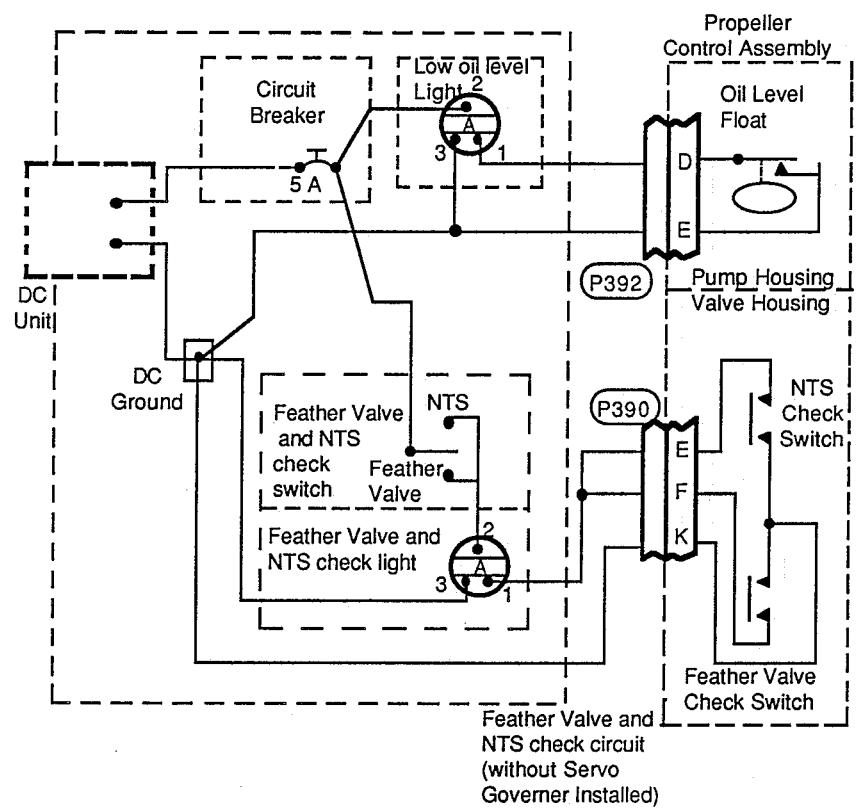
Figure 3B:
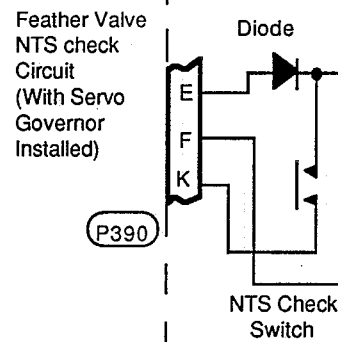

The circuitry of FIGS. 2 and 3 is most easily described by consideration of the corresponding circuitry used in controlling the propeller assembly functions in the hosting C-130 aircraft. This circuitry is described in the above referred-to technical order document and other similar documents relating to the C-130. In the aircraft, the propeller assembly functions are actually controlled by the throttle and engine condition levers which are contained in the airplane flight station and are connected by a system of linkages and cables to an engine coordinator apparatus mounted on the engine. The engine coordinator transmits motion of either the throttle or the engine condition lever to the input shaft of the propeller control assembly. When the engine condition lever is placed in the "feather" position, a switch is actuated which completes the circuit from the DC energy source through a contact of the feather relay, to the holding coil of the propeller feather override latch for the engine being considered.

Under these conditions, the propeller feather override latch button pulls in and completes a holding circuit for the latch coil, a circuit to ground through a pressure cut-out switch and a pressure cut-out backup switch. The propeller feather override latch also completes circuits to the feather pump motor relay coil, to a feather solenoid in the propeller control assembly, and to a feather relay coil. When the feather pump motor relay is energized, a circuit is closed from the alternating current source to the auxiliary pump motor which furnishes hydraulic pressure for the blade pitch changing mechanism.

The feather solenoid routes hydraulic fluid under pressure to the controlling port of the governor valve and positions the governor valve and the feathering valve to accomplish feathering of the propeller blades. By this arrangement, hydraulic positioning of the feather valve in addition to mechanical positioning by the propeller condition lever is accomplished. When the propeller reaches a position near 86 degrees of blade angle the pressure cut-out backup switch opens; this switch is provided to prevent pressure surges in the propeller hydraulic circuit from stopping the feathering operation through opening of the pressure cut-out switch. When the propeller blades reach the feathered position, the pressure cut-out switch opens to deenergize the propeller feather override latch. The latch contacts open to stop the auxiliary pump motor and deenergize the feather solenoid.

The feather relay will be energized as long as the aircraft's engine condition lever is in the "feather" position. This is to prevent cycling of the propeller feather override button when hydraulic pressure is lost after the feathering cycle. When the propeller has been feathered, holding the condition lever in the "air start" position will energize the propeller auxiliary pump motor and the propeller blades will move away from the feathered position. During flight the windmilling force on the propeller blades will then bring the engine up to a starting speed to enable its restarting.

For ground operational check-out purposes each throttle position in the taxi range corresponds to a specific propeller blade angle, therefore the air start system can be used along with the present invention for positioning the blade angle during propeller assembly ground check-out.

In the schematic diagram of FIG. 2, the electrical switching functions attributed to the engine condition lever are replaced with the electrical switches 212 and 214, which are mounted respectively on the sloping panel of the control console and at the end of a tether cord—in order to be carried along with a maintenance person working on the propeller assembly. With this exception the major portion of the upper right-hand area of the FIG. 2 schematic diagram functions in the present invention apparatus in the same manner as the similarly-named components of the aircraft control system as described above, including the contacts 228 and 230 of the feather relay, and the contacts 244, 246, 248, 250, and 252 of the feather override latch. The visual signal light of the feather override latch is shown at 254 in FIG. 2, while the coils of the feather solenoid and feather relay are indicated at 240 and 242. The feather pump motor relay coil is indicated at 238 in FIG. 2, and the controlled contacts are shown in the AC circuit portion 202 of FIG. 2.

The hydraulic pressure sensing switches in the ground lead of the feather override switch or feather override latch are indicated at 234 and 236 in FIG. 2. The encircled numbers shown in conjunction with the feather override latch components in FIG. 2 identify the terminal lug of the feather override latch assembly. The ground conductor of the FIG. 2 DC circuit is indicated at 256, a voltmeter indicating the presence of the DC control voltage is indicated at 206 in FIG. 2, and the battery, a representative source of the DC control voltage, is indicated at 204.

The battery 204 is, of course, preferably replaced with a generator, an AC-to-DC power supply or other direct current energy source in a working embodiment of the invention. An aircraft ground power unit generator of the dual voltage, AC and DC output variety is especially convenient for use in the FIG. 2 apparatus in view of the common availability of such equipment in aircraft maintenance facilities. Connection to the alternating current source portion of such a ground power unit or other energy source is indicated at 258 in FIG. 2 with the AC source terminals being designated at 260 and a voltmeter for indicating the presence of AC energy being shown at 264 in FIG. 2. The windings of the auxiliary pump motor, a three-phase Y-connected motor, are indicated at 268, 269, and 270 in FIG. 2.

The portion of the FIG. 2 DC circuit indicated at 274 provides a visual indication of the functioning of certain sensor switches located in the propeller assembly. The sensor switches include an oil level float switch 222 which indicates hydraulic fluid level in the propeller reservoir, the NTSCS or negative torque system check switch indicated at 226, and the feather valve check switch at 224. These switches operate the visual indicator lamps indicated at 218 and 220 in FIG. 2, such lamps corresponding to the visual signal lamps indicated at 120 and 122 on the sloping panel of the FIG. 1 console.

The third electrical lead of the visual indicator lamps 118 and 220 serves in a "push to test" verification circuit for lamp operation in a manner which is known in the visual signal art. The switch 216 in FIG. 2 is used to disable indicator lamp 220 during preparations for a test-in order to prevent undesirable false lamp flashing.

Several aspects of the FIG. 2 circuit provide notably desirable convenience for the maintenance person using the present invention. These features include the latch-in nature of the feather override switch, the remotely positionable portable tether for the switch 214 and the ability to monitor operation of the sensor switches located in a propeller assembly being tested. Each of these features contributes to an increased rate of productivity and an easier work environment in a propeller maintenance shop. Additional convenience features of this type may be employed in other embodiment of the invention—embodiments which are, for example, intended for use with differently arranged variable pitch propeller assemblies. In some alternate embodiments, for example, it may be desirable to include a hydraulic pump and reservoir within the FIG. 1 console or to provide additional sensor indicating lamps or similar variations of the invention.

The components shown in physical representation on the sloping panel portion of the test console in FIG. 1 are shown in electrical schematic form in the FIG. 2 schematic diagram. The correspondence of these panel components and the electrical schematic components are generally as follows. The three circuit breakers 106, 108, and 110 in FIG. 1 apparatus appear at 262 in FIG. 2 and are, in fact, current protection devices in the alternating current circuit portion of the invention. The DC circuit breakers 112 and 114 in FIG. 1 appear in electrical form at 208 and 210 in FIG. 2. The two meters 126 and 128 in FIG. 1 appear at 206 and 264 in FIG. 2.

In a similar manner, the switch 116 in FIG. 1 appears electrically at 212 in FIG. 2 and the switch 118 at 216. The indicators 120 and 122 are shown electrically at 218 and 220 in FIG. 2, and the latch button 124 in FIG. 1 appears as the coil 232 and the contacts 244, 246, 248, 250, 252 and the indicator lamp 254 in FIG. 2.

The FIG. 3 drawing, which includes the views of FIG. 3A and FIG. 3B, shows components of the FIG. 2 circuit in a more pictorial form and thereby provide additional identification of component terminal numbers, connector pin identifications and other detailed aspects of the described embodiment. The FIG. 3B pictorial diagram relates principally to the FIG. 2 circuit portion indicated at 274, while the FIG. 3A pictorial diagram relates to the remaining portion of the FIG. 2 schematic. The component identification legend at 272 in FIG. 2 identifies the components shown in the FIG. 3A and 3B pictorial diagrams to a degree believed sufficient for persons skilled in the art.

Use of the presently-described test console apparatus enables a maintenance person to perform a plurality of checks, verifications and adjustments on a propeller assembly and its functional operation. Included in these enabled maintenance activities is the ability to troubleshoot the engine wiring portion which relates to the propeller assembly—i.e. the propeller assembly wiring which runs from the engine firewall through the engine compartment to the propeller assembly. Jumper cables which connect the present invention console cables to the propeller assembly firewall connections rather than to the propeller assembly itself may be used to provide this additional troubleshooting convenience-and also enable easier use of the present invention apparatus; since in practice it is found to be more convenient to disconnect the propeller assembly cables at the firewall location than at the propeller assembly.

The FIG. 1 console apparatus may also be appreciated to prove a convenient aid for use in the training of maintenance personnel because it affords the capabilitY of performing the final functional and leak testing of propeller assembly work performed by trainee personnel without involving the need for aircraft mounting of the worked-upon propeller assembly or the consumption of aircraft "down" time for training purposes.

The apparatus of the present invention therefore provides a significant degree of time saving, inclement weather avoidance, aircraft on-line or "up" time and other improvements in a propeller assembly maintenance setting.

While the apparatus and method herein described constitute a preferred embodiment of the invention, it is to be understood that the invention is not limited to this precise form of apparatus or method, and that changes may be made therein without departing from the scope of the invention, which is defined in the appended claims.

We claim:

1. Servicing apparatus for functionally exercising the control system of an electro-hydraulic variable pitch aircraft propeller assembly comprising a maintenance person operable test console which includes the following components:
   electrical source means for energizing a propeller blade positioning hydraulic pump disposed within said propeller assembly;
   electrically controlled contactor means for connecting said hydraulic pump with said electrical source means;
   first manually maintainable means for energizing said contactor means until said propeller assembly blades attain an operator-selected pitch position within the range of reverse thrust to maximum forward propulsion thrust; and
   second means manually initiated and electrical latch maintained for energizing said contactor means until said propeller assembly blades attain a minimum aircraft slipstream engaging feathered position.

2. The apparatus of claim 1 wherein said manually initiated and electrically maintained latching means includes latching release mean responsive to attainment of said feathered blade position.

3. The apparatus of claim 1 wherein said electrical source means includes a distally located and tether connected first source of low voltage direct current energy and a second source of higher voltage alternating current energy capable of energizing said hydraulic pump.

4. The apparatus of claim 1 further including a console tethered plurality of electrical conductors engageable at a remote end thereof with electrical connection port conductors disposed on said propeller assembly.

5. The apparatus of claim 1 further including a console tethered plurality of electrical conductors engageable at a remote end thereof with electrical connection port conductors disposed on an aircraft engine driving said aircraft propeller assembly.

6. The apparatus of claim 1 wherein said manually initiated and electrically maintained latching means includes an array of electromagnetic coil operated electrical contacts.

7. The apparatus of claim 6 wherein said latching means includes a latch releasing signal that is responsive to hydraulic pressures generated by said hydraulic pump within said propeller assembly.

8. The apparatus of claim 1 wherein said first manually maintainable means for energizing and said manually initiated and electrically maintained latching means include a first manually operable selection switch.

9. The apparatus of claim 8 further including a second manually operable selection switch connected in electrical parallel with said first selection switch and located at a remote end of a console connected flexible tether cable.

10. The apparatus of claim 1 further including signalling means for indicating the static condition of a plurality of condition sensors disposed within said propeller assembly.

11. The apparatus of claim 10 wherein said condition sensors include a plurality of sensors taken from the group comprising a float actuated liquid responsive sensor, a negative engine torque responsive sensor, and feathering valve position responsive sensors.

12. Testing and repair person training apparatus for exercising the functions of an engine-mounted and aircraft detached blade pitch variable aircraft propeller assembly comprising the combination of:
   a portable console member having a repair person accessible control panel and flexible tether cabels engageable with a source of electrical energy and with propeller blade pitch controlling electrical conductors in said propeller assembly;
   means responsive to a continuing command from said repair person at said console panel for energizing the blade pitch changing apparatus of said propeller assembly;
   means responsive to a transient command from said repair person at said console control panel for continuously energizing the blade pitch changing apparatus of said propeller assembly until a predetermined blade pitch angle is achieved;
   means disposed on said control panel and responsive to signals from said propeller assembly for indicating the occurrence of predetermined normal and abnormal events during energization of said blade pitch changing apparatus.

13. The apparatus of claim 12 further including repair person actuatable control means, portably disposed with respect to said console member and said control panel and connected therewith by a flexible tether cable, for receiving said repair person continuing and transient commands from a location remote from said console member.

14. The apparatus of claim 12 wherein said propeller assembly further includes a blade position determining signal input that is operable by said repair person.

15. The apparatus of claim 12 further including means for engaging said interfacing electrical conductors in a plurality of different physical positions adjacent said engine.

16. The apparatus of claim 15 wherein said different physical positions include a first position adjacent said propeller apparatus and a second position adjacent the rear firewall region of said engine.

17. Apparatus for exercising the functions of an engine mounted and aircraft detached variable blade pitch propeller assembly during maintenance and maintenance technician training activities thereon comprising the combined elements of:

a source of direct current electrical energy of nominal potential less than fifty volts;

a source of three-phase alternating current electrical energy of nominal voltage potential compatible with an electric motor of an auxiliary hydraulic pump disposed within said propeller assembly;

a portable maintenance console assembly having a technician-accessible control panel and flexible tether cables engageable with said sources of electrical energy and with propeller blade pitch controlling electrical conductors in said propeller assembly;

an electrical contactor operable by said direct current electrical energy and connected to control the flow of said three phase electrical energy to said pump motor;

first switch means received on said control panel for operation by sustained force from said technician to energize said electrical contactor and said pump until said propeller assembly blades attain a technician-selected blade pitch position within the range of reverse thrust to maximum forward thrust;

electrical latching means operable by said direct current electrical energy and connected with said electrical contactor for energizing said contactor and said pump motor continuously in response to a transient command;

second switch means received on said control panel and operable by a transient force from said technician to energize said electrical latching means, said electrical contactor, and said pump motor until said propeller assembly blades attain a minimum aircraft slipstream energizing and rotationally static feathered position; and visual signalling means disposed on said control panel and responsive to the open and closed statuses of event sensing switches disposed in said propeller assembly for indicating to said technician the occurrence of predetermined normal and abnormal events during energized pump motor changing of said blade position.

18. The apparatus of claim 17 wherein said direct current electrical energy source has a nominal potential of twenty-eight volts and said source of alternating current electrical energy has a nominal frequency of four hundred cycles per second and a nominal voltage of one hundred twenty volts between phase and neutral terminals thereof.

19. The apparatus of claim 17 further including portable switch means connected with said first and second switch means of said console assembly and control panel by a flexible tether cable for operating said electrical contactor, said electrical latching means, and said pump motor from a console distal and engine and propeller blade adjacent location.

* * * * *

UNITED STATES PATENT AND TRADEMARK OFFICE
CERTIFICATE OF CORRECTION

PATENT NO. : 4,969,367

DATED : November 13, 1990

INVENTOR(S) : Kenneth R. Huber et al

It is certified that error appears in the above-identified patent and that said Letters Patent is hereby corrected as shown below:

```
Col 1, line 20, "and; of course;" should be
         ---and, of course, ---.
Col 1, line 42, "frequency" should be ---frequently---.
Col 1, line 47, after "addition" a comma should be inserted.
Col 1, line 55, "complexitY" should be ---complexity---.
Col 1, line 60, after "example" a comma should be inserted.
Col 2, line 66, "signal;" should be ---signal,---.
Col 3, line 52, "proVide" should be ---provide---.
Col 5, line  3, "The" should be ---These---.
Col 5, line  3, "the coil" should be ---the magnetic coil---.
Col 5, line 32, "torque;" should be ---torque,---.
Col 5, line 43, "are; in fact;" should be ---are, in fact,---.
Col 5, line 59, after "above" a comma should be inserted.
Col 9, line  1, "apparatus;" should be ---apparatus,---
Col 9, line  7, "capabilitY" should be ---capability---.
Col 9, line 49, "mean" should be ---means---.
```

Signed and Sealed this

Twenty-first Day of July, 1992

*Attest:*

DOUGLAS B. COMER

*Attesting Officer*    *Acting Commissioner of Patents and Trademarks*